US007583771B2

(12) United States Patent
Zweigle et al.

(10) Patent No.: US 7,583,771 B2
(45) Date of Patent: Sep. 1, 2009

(54) SYSTEMS AND METHODS FOR RESAMPLING UNRELIABLE DATA

(75) Inventors: Gregory C. Zweigle, Pullman, WA (US); Ian C. Ender, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 11/894,357

(22) Filed: Aug. 21, 2007

(65) Prior Publication Data
US 2008/0049880 A1 Feb. 28, 2008

Related U.S. Application Data

(60) Provisional application No. 60/839,633, filed on Aug. 22, 2006.

(51) Int. Cl.
*H04L 27/08* (2006.01)
(52) U.S. Cl. ........................................ 375/355
(58) Field of Classification Search ................. 375/355
See application file for complete search history.

(56) References Cited

U.S. PATENT DOCUMENTS

| | | | | |
|---|---|---|---|---|
| 4,755,795 | A * | 7/1988 | Page | 341/51 |
| 5,043,928 | A * | 8/1991 | Odencrantz et al. | 356/319 |
| 5,235,534 | A | 8/1993 | Potter | |
| 5,268,750 | A * | 12/1993 | Stec et al. | 348/453 |
| 5,473,555 | A | 12/1995 | Potter | |
| 5,613,084 | A | 3/1997 | Hau | |
| 5,963,160 | A * | 10/1999 | Wilson et al. | 341/143 |
| 6,915,225 | B2 | 7/2005 | Jorgensen | |
| 7,194,676 | B2 | 3/2007 | Fayan | |
| 7,203,718 | B1 * | 4/2007 | Fu et al. | 708/622 |
| 2002/0184277 | A1 * | 12/2002 | Chu | 708/313 |
| 2007/0064835 | A1 * | 3/2007 | Auranen | 375/316 |
| 2007/0219751 | A1 * | 9/2007 | Huang | 702/187 |
| 2008/0049880 | A1 | 2/2008 | Zweigle | |

OTHER PUBLICATIONS

SEL-421, High-Speed Line Protection, Automation, and Control System, published online on or before Sep. 07, 2001.*
Hildebrand, "Introduction to Numerical Analysis" published in 1987 section 2.2 "linear interpolation" pp. 51-55 and 80-85.*

(Continued)

*Primary Examiner*—Juan A Torres
(74) *Attorney, Agent, or Firm*—Eugene M. Cummings, P.C.

(57) ABSTRACT

Systems and methods providing resampling of a sampled data transmitted through a communication channel. Reliable resampling is provided even when original data samples are lost or reordered during transmission through the network. In one embodiment, a receiver associates each received data sample with a respective sampling time instant. The received data may include index values that associate the received data samples with respective sampling time instants. In other embodiments, the received data includes time stamps with encoded sampling time instant information. In another embodiment, arrival time instants are used to correlate the received data samples with their respective sampling time instants. The receiver then uses the sampling time information to select data samples corresponding to resampling time instants. If needed, the receiver uses interpolation to generate resampled data points corresponding to the resampling time instants.

42 Claims, 8 Drawing Sheets

OTHER PUBLICATIONS

Reference Values for Dynamic Calibration of PMU's; Gerard Stenbakken and Tom Nelson, National Institute of Standards and Technology, Gaithersburg, MD, and Ming Zhou and Virgilio Centeno. Virginia Polytechnic Institute and State University. Blacksburg. VA: Proceeding of the 41$^{st}$ Hawaii International Conference on System Sciences-2008, 6 pages.

Discrete-Time Signal Processing, pp. 111-112; Alan V. Oppenheim and Ronald W. Schafer; By Prentice-Hall, Inc. 1989.

IEC 61850-9-2, International Standard, First Edition Apr. 2004; Communication networks and systems in substations—Part 9-2: Specific Communication Service Mapping (SCSM)—Sampled values over ISO/IEC 8802-3.

* cited by examiner

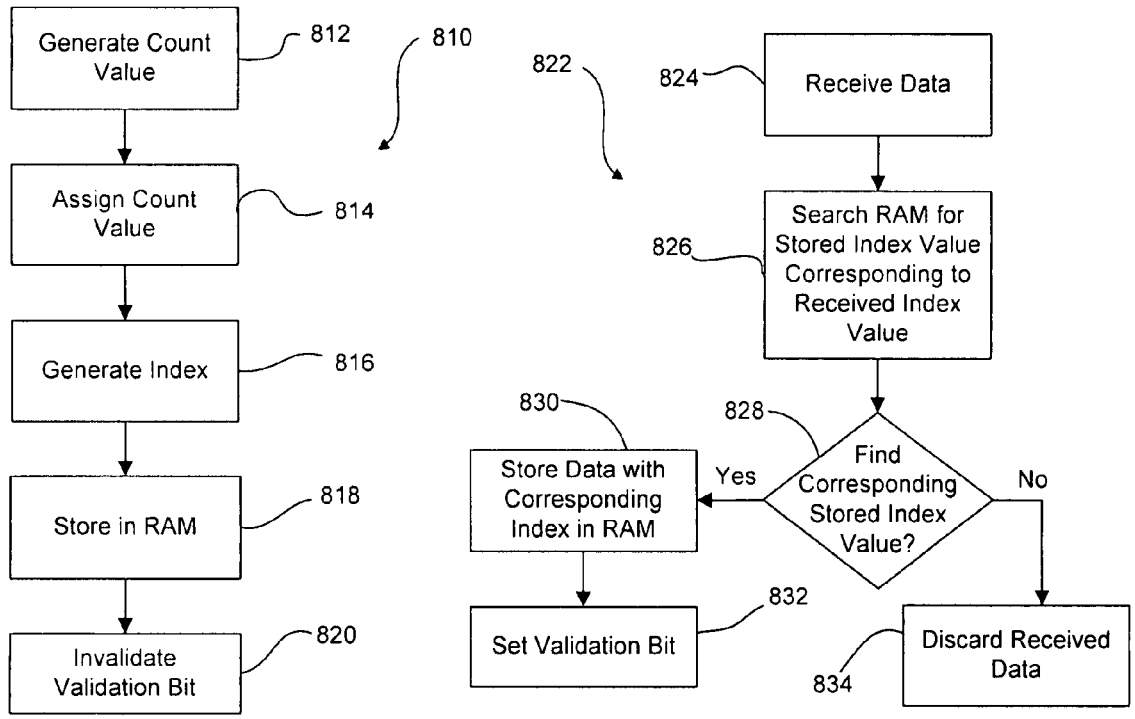
FIG. 8A
FIG. 8B
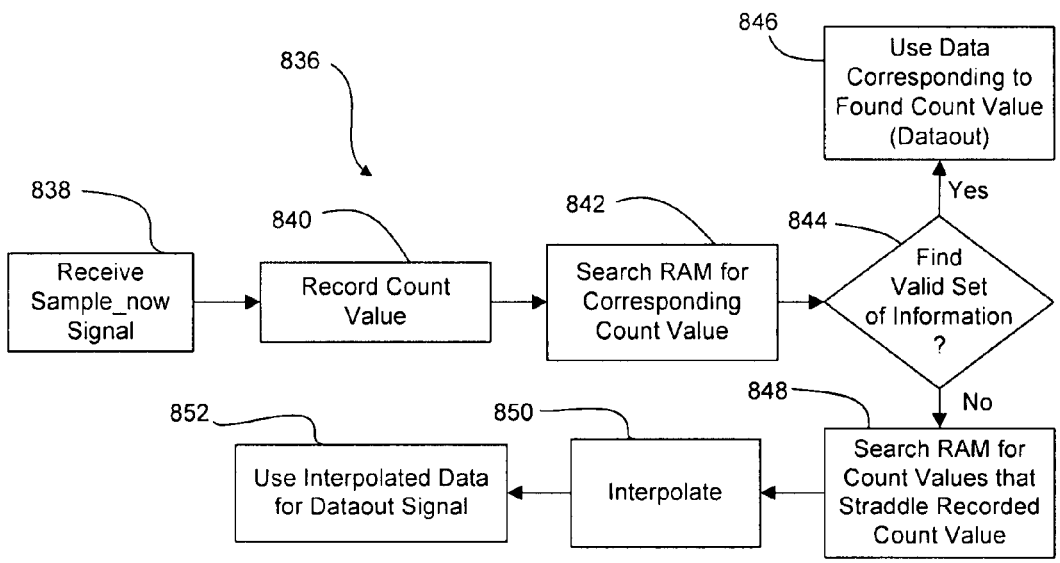
FIG. 8C

SYSTEMS AND METHODS FOR RESAMPLING UNRELIABLE DATA

RELATED APPLICATION

This application claims the benefit under 35 U.S.C. § 119 (e) of U.S. Provisional Application No. 60/839,633, filed Aug. 22, 2006, naming Gregary C. Zweigle and Ian C. Ender as inventors, which is hereby incorporated by reference herein in its entirety.

TECHNICAL FIELD

This disclosure relates to digital signal processing. More particularly, this disclosure relates to systems and methods for changing the sample rate of a digital signal. This disclosure also relates to data reception and coordination with time.

BRIEF DESCRIPTION OF THE DRAWINGS

Non-limiting and non-exhaustive embodiments of the disclosure are described, including various embodiments of the disclosure with reference to the figures, in which:

FIGS. 8A, 8B and 8C are flow charts illustrating a method for resampling data using synchronized index values according to one embodiment;

DETAILED DESCRIPTION

I. Overview

Figure 1:
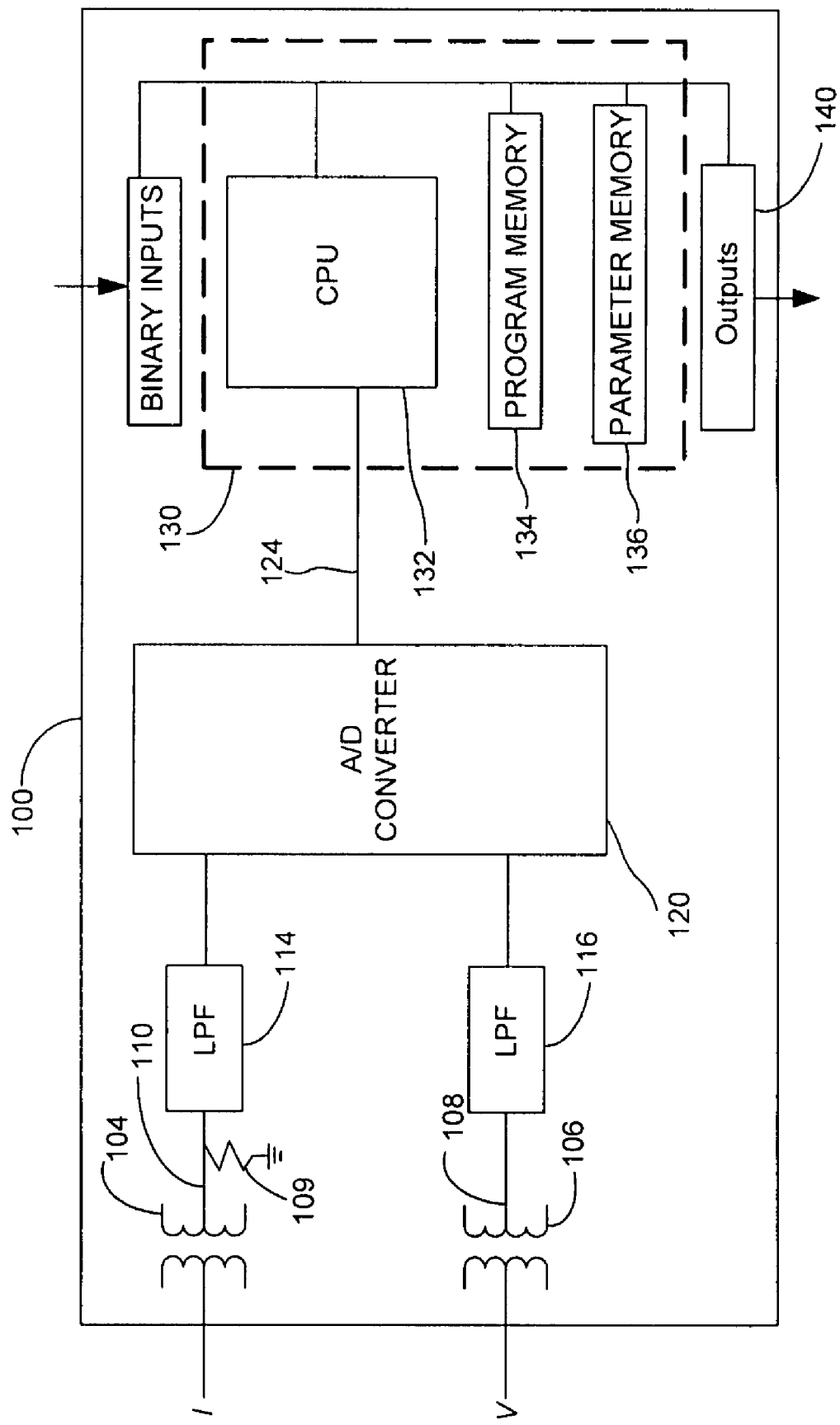
FIG. 1 is a block diagram illustrating a first intelligent electronic device (IED) used in a power system and configured in certain embodiments to provide sampled data and information for resampling the data to a second IED.

Data resampling is an operation that converts a signal from one sampling frequency to another sampling frequency. For example, data sampled at one frequency (e.g., for a digital music recording) may be resampled at a different frequency before being stored on recording media (e.g., hard drive, floppy disc, compact disc (CD), digital versatile disc (DVD), flash memory, magnetic tape, or other memory device). In another example, power system information at one location may be initially sampled at a first frequency and resampled at a second frequency before being transmitted, stored or compared with other sampled power system information. The resampling may be done such that the sampled data is synchronized in time with another set of sampled or resampled data.

Generally, digital signal processing systems uniformly sample an analog signal at a fixed and known rate in order to apply mathematical relationships to the analysis and processing of the data. In some conventional systems, signal processing operations process the data at different rates in various sections of the system. Many well-known resampling algorithms are available to provide conversion of data between rates. For example, Oppenheim and Schafer (Discrete-Time Signal Processing, Prentice Hall, 1989, pg. 111-112) describe a system whereby the data is first interpolated to insert L−1 zero values between each sample, followed by discrete time filtering with a low pass filter of gain L and with cutoff frequency the minimum of pi/L and pi/M radians, followed by removing M−1 out of every M values. The overall rate is changed by a factor of L/M. In many systems these signal processing operations are all performed within a single processing element. For example, a computer aided design application executing on a single desktop computer may provide resampling capabilities.

In some conventional systems, the data is communicated from one location to another and the resampling is provided at either the transmission or the reception end of the communication channel. When resampling is required after receiving data, it is generally important for the receiver to guarantee that the data arrives reliably and uncorrupted. Many communication algorithms such as equalization filtering, error correction codes, and repeated transmission handshakes have been developed to ensure reliable reception.

However, some conventional communication systems are unreliable to the extent that data can sometimes not be available at any time to the resampling algorithms. Further, the data may arrive properly but be out of order, thereby providing the samples to the digital signal processing algorithm rearranged in time.

Thus, systems and methods disclosed herein provide rate changing capabilities in a manner that operates reliably even when applied to unreliable data. Unreliable data may be any data wherein data points are missing, data points are out of order, the data is not readily available, and the like.

The resampling disclosed herein may be performed by a wide variety of intelligent electronic devices (IEDs) such as, without limitation, microprocessors in embedded systems, logic devices such as FPGAs, communication system processors, servers, workstations, desktop computers, laptop computers, personal digital assistants (PDAs), cellular telephones, kiosks, point-of-sale terminals, and other computing devices.

In certain example embodiments disclosed herein, an IED configured to resample data includes a microprocessor-based power system control, monitoring, protection, communication and/or automation device. Accordingly, although the systems and methods for resampling data disclosed herein may be used in any IED that requires resampling, several of the disclosed embodiments illustrate the use of resampling methods in terms of power system data handling. In one example embodiment, the IED may be a power system protection, automation and control device such as an SEL-421, or a synchrophasor processor such as an SEL-3306 (both available from Schweitzer Engineering Laboratories, Inc., Pullman, Wash.). In another example embodiment, the systems and methods disclosed herein may be implemented into an IED running software used for resampling audio files.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described will be illustrated as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

II. Example Data Sampling Device

FIG. 1 is a block diagram illustrating a first intelligent electronic device (IED) 100 used in a power system and configured in certain embodiments to provide sampled data and information for resampling the data to a second IED. The first IED 100 may be used, for example, in the power system's protection, automation, control, and/or metering applications to gather analog data directly from a conductor (not shown) using a current transformer 104 and/or a voltage transformer 106. The voltage transformer 106 may be configured to step-down the power system's voltage (V) to a secondary voltage waveform 108 having a magnitude that can be readily monitored and measured by the first IED 100 (e.g., to step-down the distribution line voltage from approximately 13 kV to approximately 120 V). Similarly, the current transformer 104 and a resistor 109 may be configured to proportionally step-down the power system's line current (I) to a secondary current waveform 110 having a magnitude that can be readily monitored and measured by the first IED 100 (e.g., to step-down the distribution line current from approximately 200 amps to approximately 0.2 amps). Low pass filters 114, 116 respectively filter the secondary current waveform 110 and the secondary voltage waveform 108. An analog-to-digital converter 120 then multiplexes, samples and digitizes the filtered waveforms to form a corresponding digitized current and voltage signals 124.

The digitized current and voltage signals 124 are received by a microcontroller 130 configured to perform digital signal processing. For example, the microcontroller 130 may use Cosine filters to eliminate DC and unwanted frequency components from the digitized current and voltage signals 124. In one embodiment, the microcontroller 130 includes a central processing unit (CPU) or microprocessor 132, a program memory 134 (e.g., a Flash EPROM), and a parameter memory 136 (e.g., an EEPROM). As will be appreciated by those skilled in the art, other suitable microcontroller configurations may be used. Further, although discussed in terms of a microcontroller, it should be noted that the embodiments disclosed herein may be practiced using a field-programmable gate array (FPGA), application specific integrated circuit (ASIC), or other programmable logic device.

The microprocessor 132, by executing a computer software program or logic scheme, processes the digitized current and voltage signals 124 to extract phasors representative of the measured secondary voltage waveform 108 and the secondary current waveform 110. The microprocessor 132 then performs various calculations and digital signal processing algorithms using the phasors. The microprocessor 132 may also provide outputs 140 based on the results of the calculations and digital signal processing.

In one embodiment, the first IED 100 is also configured to transmit the digitized current and voltage signals 124 for further signal processing and/or resampling. In certain such embodiments, the first IED 100 is configured to transmit information with the digitized current and voltage signals 124 to assist with resampling. For example, as described in detail below, the first IED 100 may be configured to transmit an index representing a predetermined sampling time instant, a time stamp with an encoded time instant, and/or other information described herein for use by another IED to resample the digitized current and voltage signals 124.

An artisan will recognize from the disclosure herein that the first IED 100 shown in FIG. 1 for use in a power system is provided by way of example only and that the embodiments disclosed herein may be used in a wide variety of applications such as distributed systems used, for example, in radar, aerospace, telecommunication, broadcast, oil and gas, environmental and any other industry that transmits sampled data from one location to another.

III. Example Resampling System

Figure 2:
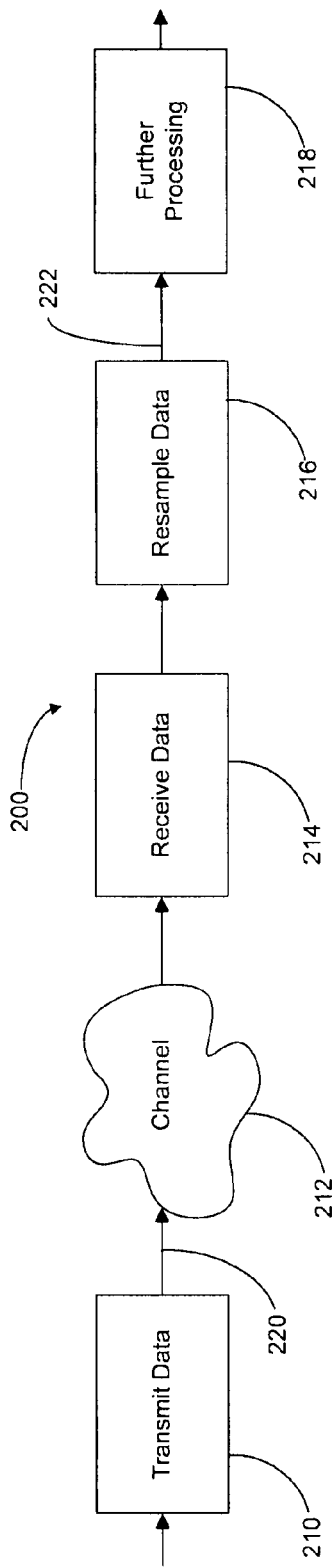
FIG. 2 is a block diagram of a system for resampling transmitted data according to one embodiment.

FIG. 2 is a block diagram of a system 200 for resampling transmitted data according to one embodiment. The system 200 includes a transmit data component 210, a communication channel 212, a receive data component 214, a resample data component 216, and a further processing component 218. In one embodiment, the transmit data component 210 is located in a first IED (e.g., the first IED 100 shown in FIG. 1) and the receive data component 214, resample data component 216, and the further processing component 218 are located in a second IED (e.g., the second IED 300 shown in FIG. 3). The first IED 100 is configured to sample data at a first sample rate and the second IED 300 is configured to resample the data at a second sample rate. The first and second sample rates may or may not be equal.

As illustrated generally in FIG. 2, the transmit data component 210 is configured to transmit sampled data 220 through the communication channel 212, to the receive data component 214. The communication channel 212 may include, for example, a direct connection (e.g., through a universal serial bus (USB) or the like), a local area network (LAN), a wide area network (WAN), a Public Switched Telephone Network (PSTN), a cable television (CATV) network, the Internet, or other connection services and network variations such as the world wide web, the public internet, a private internet, a private computer network, a secure internet, a private network, a public network, a value-added network, combinations of the foregoing, or the like. In one example embodiment, the data is communicated through the communication channel 212 in accordance with International Standard IEC 61850 Part 9, Section 2.

The receive data component 214 is configured to receive the sampled data 220 from the communication channel 212 and to provide the sampled data 214 to the resample data component 216. As discussed in detail below, the resample data component 216 is configured to resample the sampled data 220 and to provide resampled data 222 to the further processing component 218. The further processing component 218 generically indicates any other processing of the resampled data 222 or other functionality that is encompassed in the second IED 300 or another device.

Figure 3:
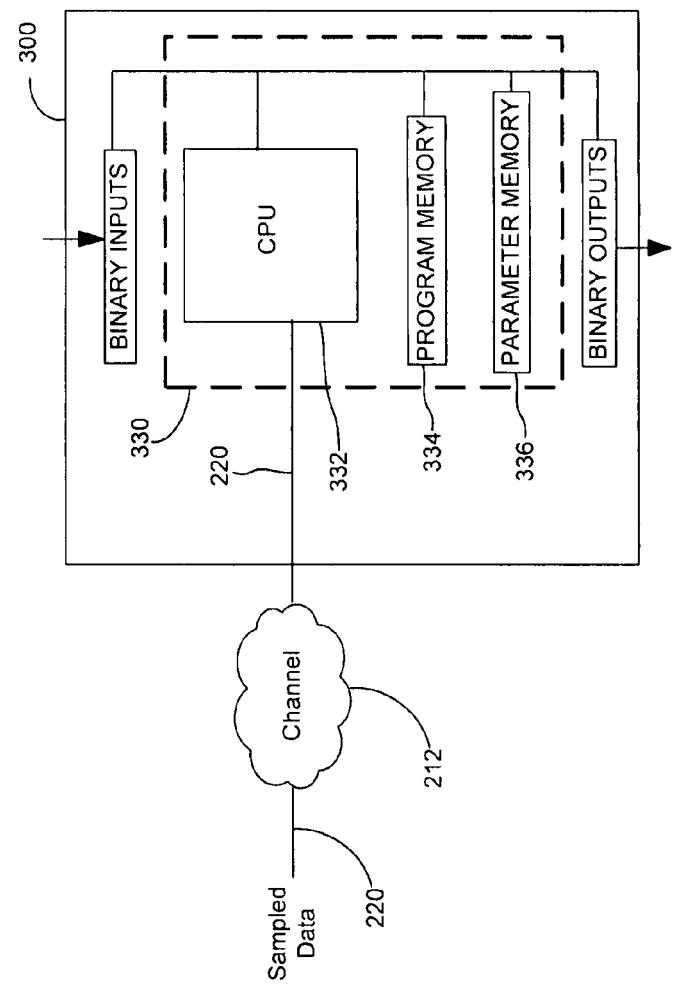
FIG. 3 is a block diagram illustrating a second IED configured to receive sampled data, resample the sampled data, and process resampled data according to one embodiment.

FIG. 3 is a block diagram illustrating a second IED 300 configured to receive sampled data 220, resample the sampled data 220, and process resampled data 222 according to one embodiment. As discussed above, the second IED 300 may receive the sampled data 220 through the communication channel 212. The second IED 300 includes a microcontroller 330 that includes a central processing unit (CPU) or microprocessor 332, a program memory 334 (e.g., a Flash EPROM), and a parameter memory 336 (e.g., an EEPROM). As will be appreciated by those skilled in the art, other suitable microcontroller configurations may be used. Further, although discussed in terms of a microcontroller, it should be noted that the embodiments disclosed herein may be practiced using an FPGA, ASIC or other programmable logic device.

In one embodiment, the microcontroller 330 includes the receive data component 214, the resample data component 216, and the further processing component 218 discussed above. The resampling may provide any arbitrary ratio of output to input rates, from a downsampling relationship, to an upsampling relationship, and with integer or non-integer ratios. Example resampling methods are discussed in detail below. Various of the resampling embodiments are described in terms of a communication system, but the present disclosure is not so limited. Rather, the embodiments are applicable in any situation where a signal processing algorithm must process data which is unreliable.

IV. Example Resampling Methods

In the following embodiments, example methods are provided for resampling data sent from a transmitter to a receiver. For purposes of discussion, the transmitter includes the transmit data component 210 discussed above. For example, in one embodiment, the transmitter includes the first IED 100 shown in FIG. 1. Also, the receiver includes at least the receive data component 214 and the resample data component 216 discussed above. For example, in one embodiment, the receiver includes the second IED 300 shown in FIG. 3. The receiver may also include the further processing component 218 discussed above. In certain embodiments, sampling time instants are synchronized between the transmitter and the receiver. In other embodiments, the sampling time instants are not synchronized between the transmitter and the receiver.

A. Resampling with Synchronized Sampling Times

In certain embodiments, data is sampled at time intervals that are predetermined between the transmitter and the receiver. Synchronization may include the use of synchronized clocks in both the transmitter and the receiver to correlate data sampled at a particular time instant at the transmitter with sampled data received at the receiver. For example, the transmitter and the receiver may each include an internal clock synchronized with a global positioning system (GPS) time standard. In one such embodiment, the transmitter is configured to assign an index value to each data sample and to transmit the index values to the receiver with the sampled data. Each index represents one of a plurality of the predetermined sampling time instants. In another embodiment, the sampling time instants are encoded as time stamps and the transmitter is configured to transmit the time stamps to the receiver with the sampled data. As discussed in detail below, the receiver then uses the received index values or time stamps to correlate the received sampled data with the respective time instants based on the synchronized GPS time. The receiver may then resample the received data at a predetermined or user-selected resampling rate.

1. Synchronized Index Values

Providing an index representing a sampling time instant requires less communication bandwidth than that required for conventional communication systems that use, for example, equalization filtering, error correction codes and/or repeated transmission handshakes. As discussed below, an index representation size may be limited according to certain embodiments by allowing the index to roll over at predetermined time instants. For example, the index may start counting from a zero value at a first one second instant and may continue counting at the receive data rate until the next one second instant, at which time it again is assigned a zero value. Of course, an artisan will understand from the disclosure herein that the predetermined time instants are not limited to one second intervals and that any predetermined interval, including fractions or multiples of a second, may be used.

Figure 4A:
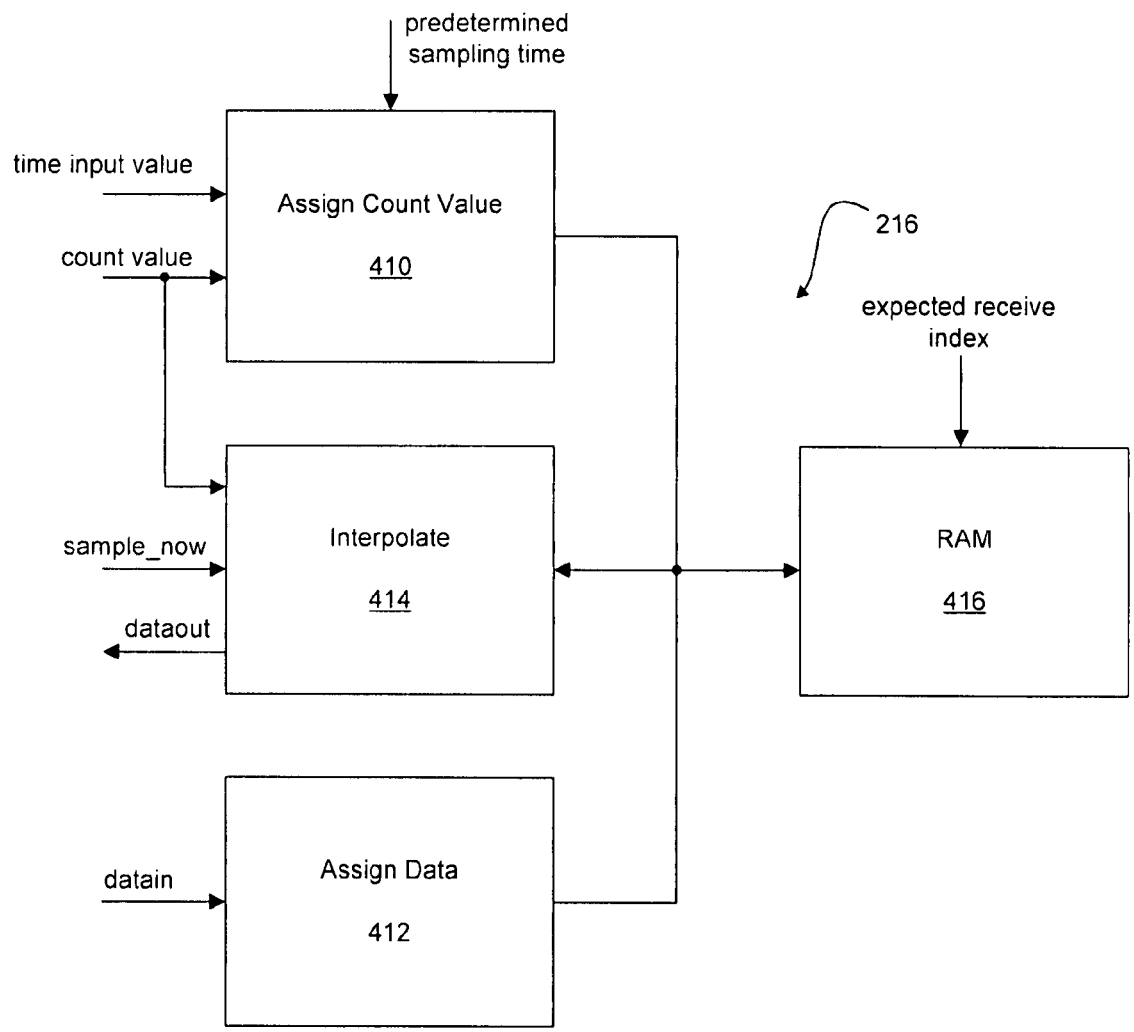
FIGS. 4A and 4B are block diagrams of the resample data component shown in FIG. 2 configured to resample data using index values sent from the transmitter to the receiver according to one embodiment.
Figure 4B:
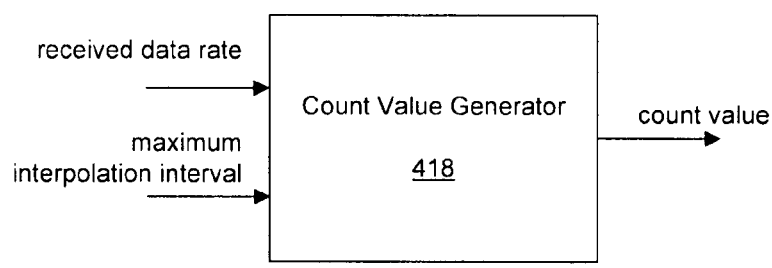

FIGS. 4A and 4B are block diagrams of the resample data component 216 shown in FIG. 2 configured to resample data using index values sent from the transmitter to the receiver according to one embodiment. As shown in FIG. 4A, the resample data component 216 according to this embodiment includes an assign count value component 410, an assign data component 412, an interpolate component 414, and a random access memory (RAM) 416. While the RAM 416 is shown as the memory device in this and other embodiments disclosed herein, an artisan will recognize that any other read-writable media may also be used. Some example memory devices include magnetic disk drive storage or FLASH memory. As shown in FIG. 4B, the resample data component 216 according to this embodiment also includes a count value generator component 418.

(i) Assign Count Value

The assign count value component 410 assigns a count value (generated by the count value generator 418 illustrated separately in FIG. 4B) associated with a time input value. The time input value is synchronized with the transmitter and may be communicated and encoded, for example, with Inter Range Instrumentation Group (IRIG) time codes. The time input value does not necessarily have to be communicated over the same channel as the sampled data. Further, the time input value does not necessarily have to be an absolute global (e.g., GPS) time, as long as the time is synchronized between the transmitter and receiver. Fixed errors (such as, for example, the transmitter being in a different time zone) in the time input value between the transmitter and receiver may be easily corrected, as is known in the art.

The count value generator 418 is configured to generate the count value provided to the assign count value component 410 and the interpolate component 414. The count value generator 418 counts at a faster rate relative to a received data rate and includes a rollover time that is longer than a maximum interpolation interval. The assign count value component 410 monitors the time input value and latches the count value to its output for storage in the RAM 416 each instant that the time input value equals one of a plurality of predetermined sampling time values. The assign count value component 410 also generates an index that it stores in the RAM 416 with the associated count value.

In one embodiment, the RAM 416 comprises a data structure (see FIG. 7) that includes an expected receive index and a validation bit. Due to the synchronization, the index stored by the assign count value component 410 matches the expected receive index for the corresponding predetermined sampling time. Because the count value is not associated with a received data sample when the assign count value module 410 stores it in the RAM 416, the assign count value block 410 simultaneously invalidates the validation bit.

(ii) Assign Data

The assign data component 412 receives a datain signal that includes sampled data and a corresponding index value. The datain signal may be received, for example, by the receive data component 214 shown in FIG. 2. The assign data component 412 is configured to search the RAM 416 using a search algorithm to locate an index value stored by the assign count value component 410 that corresponds to the index value received in the datain signal. The assigned data component 412 then stores the sampled data in the RAM 416 at a location that corresponds to the stored index value that matches the received index value. The assign data component 412 then validates the validation bit. If the receive data component 214 provides information as to the quality of the received data, then the assign data component 412 according to one embodiment may invalidate the validation bit if the communication channel 212 had an uncorrectable error for the sampled data. In addition, or in another embodiment, the assign data component 412 may use an expanded set of valid information to store information regarding the sampled data's confidence.

In certain embodiments, it is not required that the data from the datain signal arrive in any particular order. The search algorithm properly orders the data regardless as to the order in which it was received. To be used for resampling or further processing, the assign data component 412 stores the data in the RAM 416 prior to the interpolation step discussed below. However, data that is delayed such that it is not stored in the RAM 416 before the interpolation step, or data that is otherwise missing during the interpolation step, is automatically accounted for in the interpolation algorithm by increasing an interpolation step interval.

Figures 6, 7:
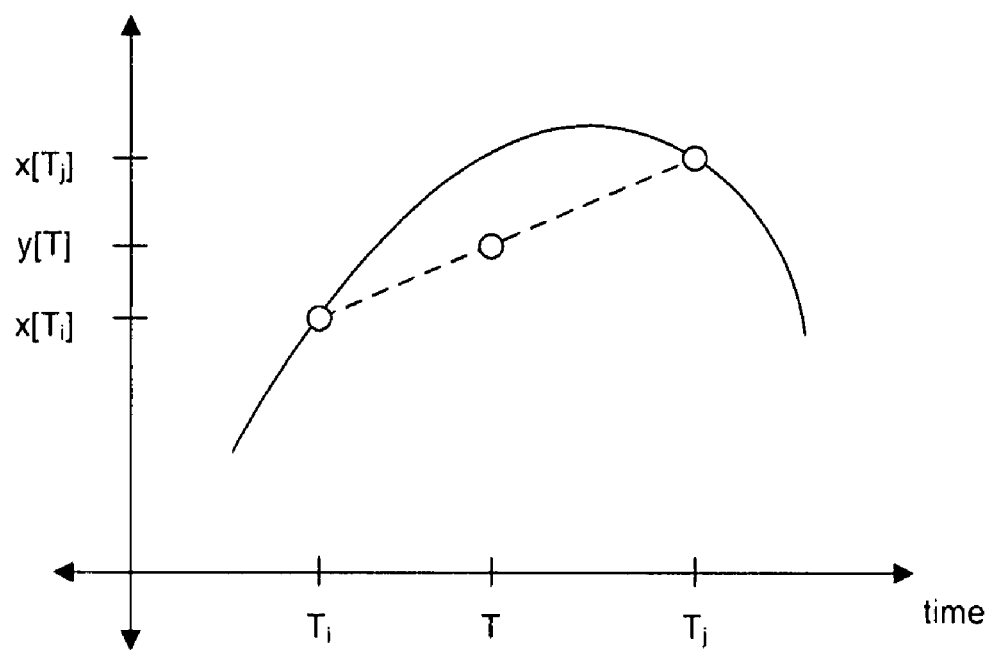
FIG. 6 is a plot illustrating an interpolation according to one embodiment.
FIG. 7 is a schematic diagram representing a data matrix as it may be stored and used according to one embodiment.

The embodiments disclosed herein are not limited to a single stream of received data. The sampled data may also arrive in sets, each of which corresponds to a single index or time stamp (discussed below). Alternatively, certain embodiments may aggregate data from several channels and receivers. FIG. 7 shows a possible arrangement of the data in the RAM 416 for the case when each received index corresponds to a set of four data. In FIG. 7, each row corresponds to one set of receive data from the receive data component 214 shown in FIG. 2. In this embodiment, each data in the set has its own related validation bit. As can be seen in FIG. 7, each row includes four slots for data, and corresponding four spots for the related valid bit, count value, and index. This allows each data to be interpolated according to the surrounding data that is valid.

(iii) Interpolate

When a local system (e.g., the second IED 300 shown in FIG. 3) requests data for resampling or further processing, the system may assert a sample_now signal. This may occur at any arbitrary rate or time instant. For example, the system may assert the sample_now signal at a rate corresponding to an upsampling or a downsampling rate. When the system asserts the sample_now signal, the interpolate component 414 records the count value generated by the count value generator 418.

In some embodiments, the receiver may generate the sample_now signal in response to a predefined system resampling ratio. In such an embodiment, the system may not specifically require a separate sample_now signal, but could instead use another control mechanism, as is known in the art, to control the interpolation at the desired output sampling rate. For example, an entire sequence of resampled outputs may be generated simultaneously by simply indicating to the interpolate component 414 a series of time stamps (as discussed below) or index values with associate count values for each of the resampled outputs.

In one embodiment, the interpolate component 414 modifies the recorded count value to insert a fixed delay. By setting a fixed delay, the effect of a variable delay of the communication channel 212, through which the data is transmitted, is reduced or eliminated. As discussed above, the fixed delay in some embodiments is sufficiently long so as to allow for the arrival of out-of-order data such that the appropriate data may be used in the interpolation.

The interpolate component 414 searches the RAM 416 for a pair of count values stored by the assign count value component 410 that straddle the count value recorded by the interpolate component 414 in response to the sample_now signal. The pair of count values according to certain embodiments are the count values that are closest in time before and after the count value recorded in response to the sample_now signal. However, if data was lost in the communication channel 212, then count values stored by the assign count value component 410 that are further apart can also be used. Once the pair is found, then the interpolate component 414 applies one of several known interpolation algorithms to determine a data value at a time instant corresponding to the sample_now signal. For example, a Taylor Series approximation truncated to the linear term performs the interpolation as follows, and is illustrated in FIG. 6:

$$y[T] = x[T_i] + (T - T_i)\frac{x[T_j] - x[T_i]}{T_j - T_i}, \quad (1)$$

where:
- y[T] is the desired data value and is associated with sample_now;
- $x[T_i]$ is the data value associated with the datain value with a count value less than the count value associated with sample_now;
- $x[T_j]$ is the data value associated with the datain value with a count value greater than the count value associated with sample_now;
- T is the count value associated with sample_now;
- $T_i$ is the count value associated with the data value $x[T_i]$; and,
- $T_j$ is the count value associated with the data value $x[T_j]$.

Some other examples of algorithms to estimate the y[T] value include fitting using more than two values, nearest neighbor interpolation, Neville's algorithm, and the like.

The interpolate component 414 then exports a dataout signal that includes the data value at the time instant corresponding to the sample_now signal. The dataout signal may be referred to herein as data resampled from the sampled data available to the receiver.

If data has been lost by the channel, or is otherwise not present, then the corresponding validation bit will not be set. In this case the search algorithm of the interpolate component 414 automatically selects the next closest received data value, and the interpolation component 414 interpolates a value for the corresponding count value associated with the sample_now signal. Therefore, the interpolation component 414 automatically corrects for lost data.

(iv) Example Resampling Method Using Synchronized Index Values

FIGS. 8A, 8B and 8C are flow charts illustrating a method for resampling data using synchronized index values according to one embodiment. The method illustrated in FIGS. 8A, 8B and 8C may be used, for example, by the resample data component 216 shown in FIGS. 4A and 4B. FIG. 8A illustrates an assign count value process 810 that begins by generating 812 a count value. The count value may be generated using a count value generator as described above. The assign count process 810 then assigns 814 the count value by associating it with a predetermined time input value, which is synchronized between a transmitter and a receiver of sampled data. The assign count value process 810 then generates 816 an index and stores 818 the index and count value in RAM. The assign count value process 810 then invalidates 820 a validation bit corresponding to the saved index and count values.

FIG. 8B illustrates an assign data process 822 that may occur in parallel with the assign count value process 810. The assign data process 822 includes receiving 824 data from the transmitter. The data includes sampled data as well as an index value. The assign data process 822 then searches 826 the RAM for a stored index value that corresponds with the received index value. The assign data process 822 also queries 828 whether the search algorithm finds the corresponding index value. If a stored index value is found, the assign data process 822 stores 830 the sampled data corresponding with the received index value along with the count value and validation bit in the RAM. The assign data process 822 then sets 832 (validates) the validation bit. If a stored index value is not found, the assign data process 822 discards 834 the received data. Thus, a table of information is created in the RAM. The table includes sets of information, each set including a count value, an index value, the received sampled data (if data is received for the corresponding count value), and a validation bit that is set if the set of information is valid.

In an embodiment, statistics may be kept by the IED correspondent to when a stored index value is not found. These statistics may be useful in identifying and correcting certain aspects of the system, such as whether the channel delay is too much larger or smaller than what is expected, which would cause these mismatches. The statistics may also be useful in identifying certain aspects of the system that are outside of the control of the system such as, for example, data corruption.

FIG. 8C illustrates an interpolation process 836 for generating resampled data. The interpolation process 836 begins by receiving 838 a sample_now signal. In response to the sample_now signal, the interpolation process 836 records 840 a count value. As described above, the count value may be corrected for inaccuracies such as, for example, for communication channel latencies, or the like. The count value correction may be performed by subtracting a fixed number of count values from the recorded count value. Where the count value is corrected for a communication channel latency, the fixed number of count values that is subtracted may correspond with the channel delay in units of count values.

Once the count value is recorded, the interpolation process 836 includes searching 842 the RAM for a set of information that includes a count value that corresponds to the recorded count value. The interpolation process 836 queries 844 whether the search finds a valid set of information (e.g., querying whether the validation bit is set). If the search 842 yields a matched count value and the validation bit is set, then the interpolation process 836 uses 846 the corresponding data value in that set of information in a dataout signal.

However, if either a valid set of information is not found (the validation bit is not set) or a corresponding data value is not found in the search 842, then the interpolation process 836 searches 848 the RAM for two sets of information with count values that straddle the recorded count value, and which both have valid sets of information (the validation bit is set). That is, sets of information with the validation bit not set are ignored. Once the two valid sets of information are found with count values that straddle the recorded count value, the interpolation process 836 interpolates 850 the data in the two valid sets of information to calculate a data point corresponding to the recorded count value. The interpolation process 836 then uses 852 the interpolated data for the dataout signal. It should be noted that the dataout signal may be used within the same microprocessor/FPGA in which the interpolation process takes place, or within another microprocessor, FPGA, or IED.

2. Synchronization with Time Stamps

Figure 5:
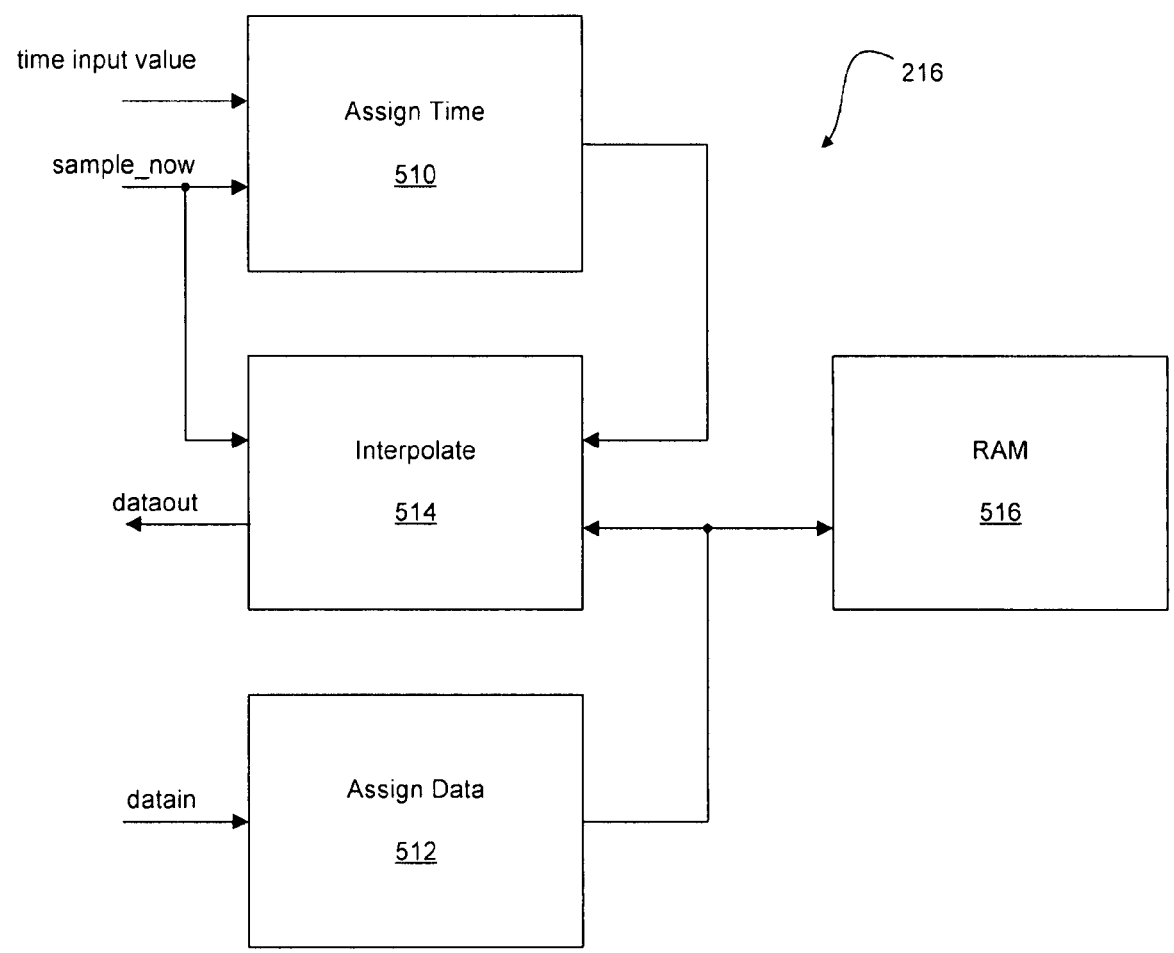
FIG. 5 is a block diagram of the resample data component shown in FIG. 2 configured to resample data using time stamps according to one embodiment.

In the second embodiment, the transmitter encodes the sampled data's sampling time instant as a time stamp and transmits the time stamp with the sampled data to the receiver. FIG. 5 is a block diagram of the resample data component 216 shown in FIG. 2 configured to resample data using time stamps according to one embodiment. Thus, the sampling time instant is communicated directly with the sampled data, and does not use an index. As shown in FIG. 5, the resample data component 216 according to this embodiment includes an assign time component 510, an assign data component 512, an interpolate component 514, and a RAM 516.

(i) Assign Time

When the sample_now signal asserts, the assign time component 510 outputs the corresponding time input value. Similar to the embodiment discussed above in relation to FIGS. 4A and 4B, the time input value is synchronized between the transmitter and the receiver and may be communicated and encoded using, for example, IRIG. The time input value does not necessarily have to be communicated over the same channel as the data. Further, the time input value does not necessarily have to be an absolute global time, as long as the time is synchronized between the transmitter and receiver. Fixed errors (such as, for example, the transmitter being in a different time zone) in the time input value between the transmitter and receiver may be easily corrected, as is known in the art.

(ii) Assign Data

The assign data component 512 receives a datain signal that includes sampled data and a corresponding time stamp. The datain signal may be received, for example, by the receive data component 214 shown in FIG. 2. The assign data component 512 is configured to store the sampled data along with its time stamp in the RAM 516. The assign data component 512 stores the sampled data at a location that corresponds to the time stamp value received. The assign data component then validates a validation bit.

(iii) Interpolate

In one embodiment, the interpolate component 514 is configured to perform similar functions as the interpolate component 414 shown in FIG. 4A. However, when the sample_now signal asserts, the interpolate component 512 uses the corresponding time input value provided by the assign time component 510 as the value against which to compare the time stamps stored in the RAM 516. As discussed above, the RAM 516 includes time stamps rather than index values or count values.

(iv) Example Resampling Method Using Time Stamps

Figure 9A:
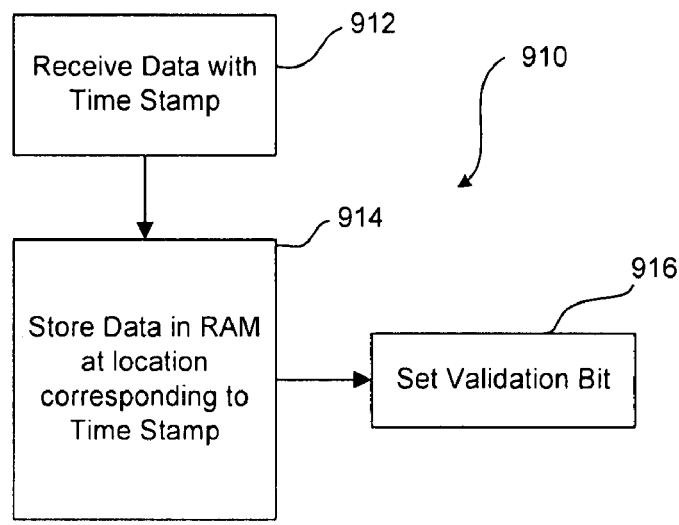
FIGS. 9A and 9B are flow charts illustrating a method for resampling data using time stamps according to one embodiment.
Figure 9B:
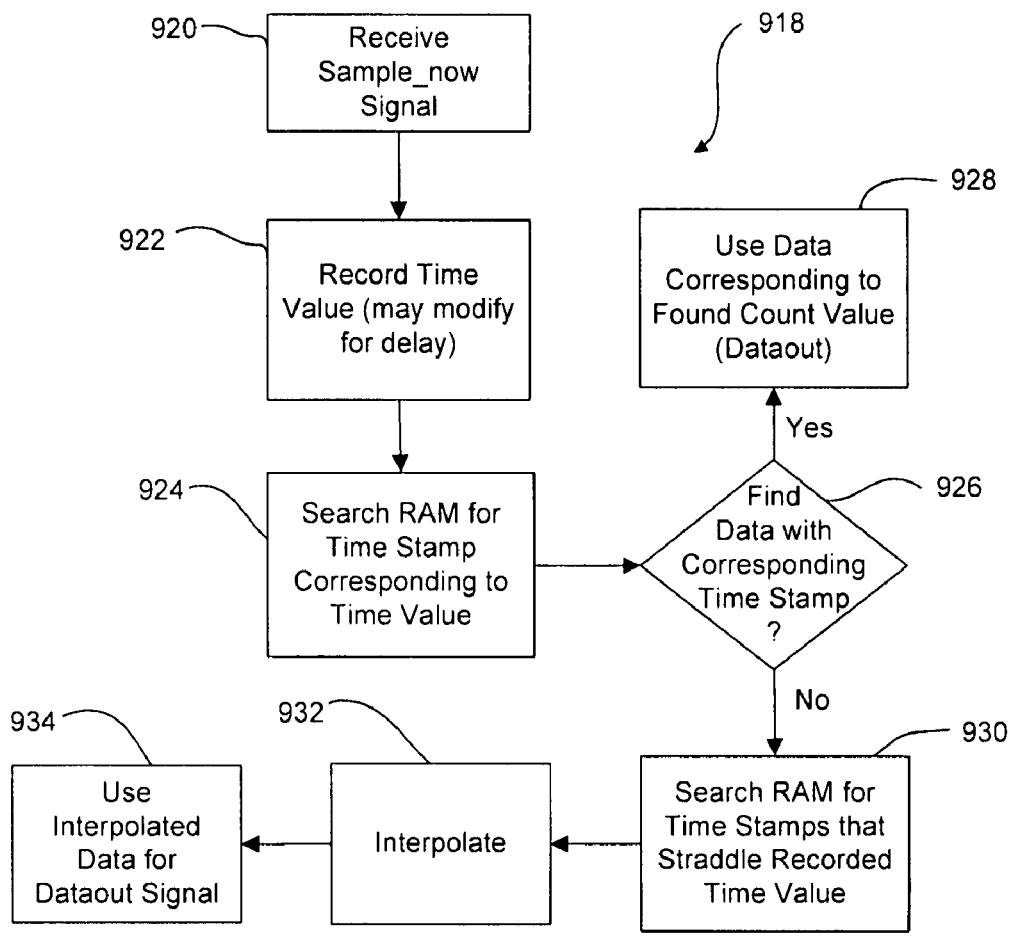

FIGS. 9A and 9B are flow charts illustrating a method for resampling data using time stamps according to one embodiment. The method illustrated in FIGS. 9A and 9B may be used, for example, by the resample data component 216 shown in FIG. 5. FIG. 9A illustrates an assign data process 910 that begins by receiving 912 sampled data with a corresponding time stamp from a receiver. The assign data process 910 then stores 914 the sampled data along with the time stamp in a RAM at a location corresponding to the time stamp. The RAM includes the time-stamped sampled data, along with a validation bit. The assign data process 910 sets 916 the validation bit when it stores the sampled data.

FIG. 9B illustrates an assign time and interpolate process 918 that begins with receiving 920 a sample_now signal. In response the sample_now signal, the process 918 records 922 a corresponding time value. The time value may be shifted to, for example, account for communication channel latencies. The shift may be performed by subtracting a fixed value from the time value. Where the time value is corrected for a communication latency, the fixed value may correspond with the channel delay. The process 918 then searches 924 the RAM for stored data with a time stamp that corresponds with the time value. The process 918 queries 926 whether the search finds data with a corresponding time stamp. If data with a corresponding time stamp is found, the process 918 uses 928 that data as the resampled data, as above, in a dataout signal.

If, however, no data with the corresponding time stamp is found, then the process 918 searches 930 the RAM for time stamps that straddle the recorded time value. As above, the process 918 uses the data if the validation bit is set. The process 918 then interpolates 932 a data point corresponding to the recorded time value using the straddling recorded time values. The process 918 then uses 934 the interpolated data point for the dataout signal.

(v) Example Time Stamp Embodiment Using Less Storage

In one embodiment, the processes 910, 918 discussed above with respect to FIGS. 9A and 9B are modified to reduce the receiver's storage requirements. In this embodiment, the assign data process 910 receives 912 the sampled data with the corresponding time stamp from the receiver. However, rather than storing 914 the sampled data along with the time stamp, the receiver generates a count value from the time stamp and stores the count value in the RAM. Thus, the receiver uses the count value as an intermediary to the full time stamp value and the storage requirements of a full time stamp value are reduced. In the process 918 shown in FIG. 9B, the RAM is searched (e.g., steps 924 and/or 930) for corresponding count values rather than corresponding time stamps.

B. Resampling with Unsynchronized Sampling Times

In certain embodiments, the sampling time instants are not synchronized between the transmitter and the receiver. In certain such embodiments the transmitter is not required to send an index or time stamp with the sampled data. Rather, the receiver is configured to use arrival time instants of the received data to provide sampling time information used for resampling. In another embodiment, the synchronization between the transmitter and the receiver may be lost or may become inaccurate over time. For example, clocks in the transmitter and receiver may slowly drift with respect to each other such that an index sent by the transmitter no longer corresponds to the time value expected by the receiver. In one such embodiment, the receiver is configured to adjust the index received from the transmitter to account for the unsynchronized time condition between the transmitter and the receiver. In another embodiment, the time keeping mechanism (e.g., clock) of the receiver is based on the arrival time instants of the received data.

1. Using Arrival Time Instants of Received Data

In one embodiment, the receiver uses the arrival time instants of the received data to provide sampling time information to the resample data component 216 shown in FIG. 2. As discussed above, this embodiment does not require the datain signal (see FIGS. 4A and 5) to include an index or a time stamp. In this embodiment, the receiver takes the arrival instant of the datain signal to represent the time of the datain sample instant. For example, the datain signal in one embodiment may include an array of data, with missing data marked as such or represented using an illegal encoding value. In another embodiment, the receiver time-stamps the data at each arrival instant with a time corresponding to the time at the receiver (as received by the time input value) at that arrival instant. In one embodiment, the sampling times are determined in advance and agreed between the transmitter and receiver. In such an embodiment, the receiver may snap the datain arrival time value to the nearest corresponding predetermined sampling time. In another embodiment, the time input value is not synchronized between the transmitter and receiver. In such an embodiment, the receiver may filter the datain arrival time instants with a phase locked loop (PLL), as is well-known in the art. Such a PLL removes jitter due to the transmitter and communication channel. In such an embodiment, the receiver may snap the arrival time instants to the nearest PLL generated expected arrival time instant. Such a PLL also generates the time interval in between samples for use with an interpolation algorithm. The receiver may then interpolate the received data and/or provide the data for further processing as described above.

2. Adjusting an Index Value to Account for an Unsynchronized Condition

In one embodiment, the index values discussed above are modified to account for an unsynchronized time condition between the transmitter and receiver. Such an embodiment may be appropriate, for example, when the time input value is not synchronized between the transmit data component 210 and the receive data component 214 shown in FIG. 2. Thus, the time input value does not need to be common between the transmitter and the receiver. In certain such embodiments, the receiver may continue resampling in spite of the fact that the relative time between the transmitter and the receiver is no longer synchronized (e.g., the respective clocks in the transmitter and receiver may be slowly drifting with respect to each other).

Referring again to FIG. 4A, in one embodiment, the assign count value module 410 is configured to adjust the index value by an offset value approximately equal to the difference between the received index value and the index value generated by the assign count value module 410. This realigns the generated index values to match those that are received and allows the resampling operations to continue. The offset value may be updated periodically based on the shift of the index values in the RAM 416, continuously after application of a filtering algorithm, or at some other time based on an overall goal of keeping the index values received and the index values generated close enough to each other in range to allow matches to be found in the RAM 416 and the resampling to be continued. The offset value provides an ability to monitor the unsynchronized condition between the transmitter and the receiver.

3. Basing the Receiver's Clock on the Arrival Time Instants

Figure 10:
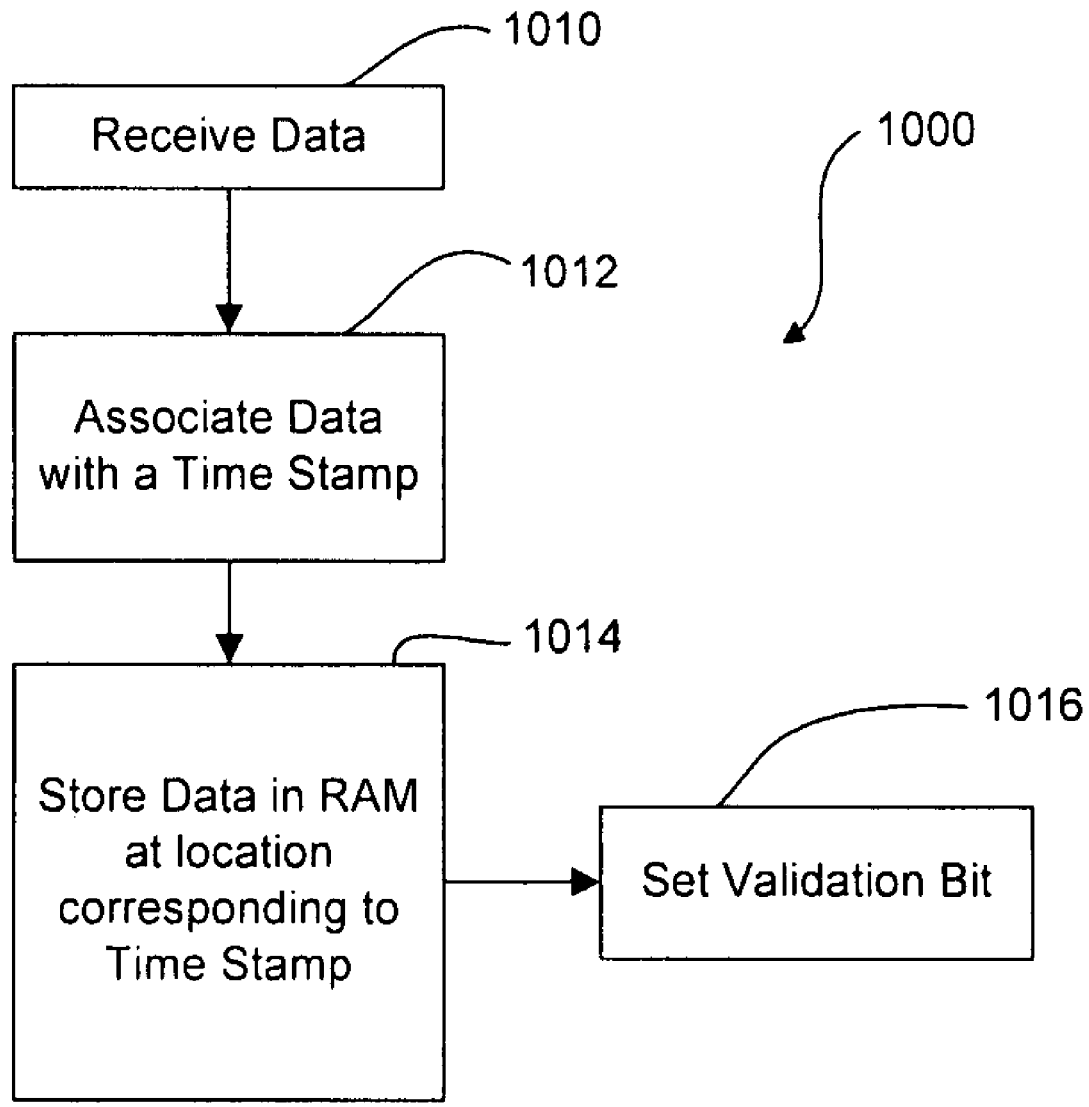
FIG. 10 is a flow chart illustrating a method for resampling data by basing a receiver's time stamp on an arrival time instant according to one embodiment.

In one embodiment, the receiver's time keeping mechanism (e.g., clock) is based on the arrival time instants of the received data. Thus, the receiver uses the arrival times of the sampled data to update the time at the receiver, instead of using the time input value. Thus, the arrival times of the sampled data effectively become the time input value. A PLL or filter may be used to reduce network jitter, as is known in the art. In embodiments that use time stamps, basing the receiver's time on the arrival time instants of the received data effectively slaves the receiver's time stamps themselves to the arrival times. After updating the receiver time in this manner, the resampling and further processing continues according to any of the above embodiments. For example, FIG. 10 is a flow chart illustrating a method 1000 for resampling data by basing a receiver's time stamp on an arrival time instant according to one embodiment. The method 1000 includes receiving 1010 data from a transmitter, associating 1012 the received data with a time stamp based on the arrival time instant of the data, storing 1014 the data in a RAM at a location corresponding to the time stamp, and setting 1016 a validation bit. In one embodiment, the method 1000 may further process the data using the time and interpolation process 918 shown in FIG. 9B.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A method for resampling a signal received through a communication channel from a remote device, the method comprising:

using an electronic device comprising a receiver in communication with the remote device through the communication channel to perform the steps of:
receiving, through the receiver, a plurality of data samples representative of an analog signal, wherein the data samples are received in a first order that is different than a second order in which the data samples are transmitted from the remote device;
associating each of the received data samples with a respective sampling time instant;
reordering, based on the association of the received data samples with the respective sampling time instants, the received data samples from the first order to the second order; and
resampling the plurality of data samples, the resampling comprising for each of a plurality of resampling time instants:
selecting one or more of the sampling time instants corresponding to the particular resampling time instant; and
generating a resampled data point from the received data samples associated with the one or more selected sampling time instants.

2. The method of claim 1, wherein generating the resampled data point comprises interpolating between two received data samples.

3. The method of claim 1, wherein associating each of the received data samples with a respective sampling time instant comprises:
generating a first count value for each of a plurality of predetermined sampling times;
generating a plurality of first index values, each first index value representing one of the plurality of predetermined sampling times;
associating each of the plurality of first index values with one of the first count values; and
storing the plurality of first index values at respective storage locations corresponding to the associated first count values.

4. The method of claim 3, further comprising:
receiving a plurality of second index values corresponding to the plurality of received data samples, each of the second index values representing one of the sampling time instants;
searching the storage locations for matches between the first index values and the second index values; and
storing the plurality of received data samples at respective storage locations based on the matches between the first index values and the second index values.

5. The method of claim 4, further comprising:
generating statistics on failures to find matches between the first index values and the second index values.

6. The method of claim 4, wherein the resampling further comprises:
for each of the plurality of resampling time instants:
recording a second count value corresponding to the particular resampling time instant;
searching the storage locations for a match between the first count values and the second count value; and
when the matching storage location includes a valid data sample, selecting the valid data sample as the resampled data point.

7. The method of claim 6, further comprising, when the matching storage location does not include a valid data sample or when the step of searching does not yield a match between the first count values and the second count values:

searching the storage locations for first count values that straddle the second count value; and interpolating the resampled data point from the data samples stored in the storage locations that straddle the second count value.

8. The method of claim 3, further comprising adjusting the plurality of first index values to account for an unsynchronized time condition between a transmitter configured to transmit the plurality of data samples and a receiver configured to receive the plurality of data samples.

9. The method of claim 1, wherein associating each of the received data samples with a respective sampling time instant comprises:

receiving a time stamp with each of the plurality of data samples, each time stamp encoded with one of the sampling time instants; and storing the plurality of received data samples at storage locations corresponding to their respective time stamps.

10. The method of claim 9, wherein the resampling further comprises:

for each of the plurality of resampling time instants:

recording a time value corresponding to the particular resampling time instant;

searching the storage locations for a match between the recorded time value and the time stamps; and when the matching location includes a valid data sample, selecting the valid data sample as the resampled data point.

11. The method of claim 10, further comprising, when the matching storage location does not include a valid data sample or when the step of searching does not yield a match between the first count values and the second count values:

searching the storage locations for time stamps that straddle the recorded time value; and interpolating the resampled data point from the data samples stored in the storage locations that straddle the recorded time value.

12. The method of claim 9, further comprising:

generating a count value based on each received time stamp;

storing each count value at the storage location associated with its corresponding data sample; and using the count values to identify the storage locations associated with the respective time stamps.

13. The method of claim 1, wherein associating each of the received data samples with a respective sampling time instant comprises:

determining an arrival time instant of each received data sample; and associating each arrival time instant with a predetermined sampling time.

14. The method of claim 13, further comprising the step of updating a time-keeping mechanism based on the arrival time of a received data sample.

15. The method of claim 1, wherein associating each of the received data samples with a respective sampling time instant comprises:

determining an arrival time instant of each received data sample;

filtering the arrival time instants to generate expected arrival time instants; and associating each of the received data samples with one of the expected arrival time instants.

16. The method of claim 1, further comprising using the resampled data points for protection of an electric power system.

17. A system for resampling data, comprising:

a receiver configured to:

receive a plurality of data samples through a communication channel, the data samples representative of an analog signal, wherein the data samples are received in a first order that is different than a second order in which the data samples are transmitted from a remote device;

associate each of the received data samples with a respective sampling time instant; and reorder, based on the association of the received data samples with the respective sampling time instants, the received data samples from the first order to the second order;

a storage media for storing the plurality of data samples; and a resampler for resampling the plurality of data samples, for each of a plurality of resampling time instants the resampler configured to:

select one or more of the sampling time instants corresponding to the particular resampling time instant; and generate a resampled data point from the received data samples associated with the one or more selected sampling time instants.

18. The system of claim 17, wherein the resampler comprises an interpolater configured to interpolate between two received data samples.

19. The system of claim 17, wherein the receiver is further configured to:

generate a first count value for each of a plurality of predetermined sampling times;

generate a plurality of first index values, each first index value representing one of the plurality of predetermined sampling times;

associate each of the plurality of first index values with one of the first count values; and store the plurality of first index values at respective storage locations in the storage media corresponding to the associated first count values.

20. The system of claim 19, wherein the receiver is further configured to:

receive a plurality of second index values corresponding to the plurality of received data samples, each of the second index values representing one of the sampling time instants;

search the storage locations for matches between the first index values and the second index values; and store the plurality of received data samples in the storage media at respective storage locations based on the matches between the first index values and the second index values.

21. The system of claim 20, further comprising the step of generating statistics corresponding to a failure to find matches between the first index values and the second index values.

22. The system of claim 20, wherein the resampler is further configured to:

for each of the plurality of resampling time instants:

record a second count value corresponding to the particular resampling time instant;

search the storage locations for a match between the first count values and the second count value; and when the matching storage location includes a valid data sample, select the valid data sample as the resampled data point.

23. The system of claim 22, wherein when the matching storage location does not include a valid data sample or when there is no match between the first count values and the second count value, the resampler is further configured to:
- search the storage locations for first count values that straddle the second count value; and
- interpolate the resampled data point from the data samples stored in the storage locations that straddle the second count value.

24. The system of claim 19, wherein the receiver is further configured to adjust the plurality of first index values to account for an unsynchronized time condition between a transmitter configured to transmit the plurality of data samples and the receiver.

25. The system of claim 17, wherein the receiver is further configured to:
- receive a time stamp with each of the plurality of data samples, each time stamp encoded with one of the sampling time instants;
- store the plurality of received data samples at storage locations in the storage media corresponding to their respective time stamps.

26. The system of claim 25, wherein the resampler is further configured to:
- for each of the plurality of resampling time instants:
  - record a time value corresponding to the particular resampling time instant;
  - search the storage locations for a match between the recorded time value and the time stamps; and
  - when the matching location includes a valid data sample, select the valid data sample as the resampled data point.

27. The system of claim 26, wherein the resampler is further configured to, when the matching storage location does not include a valid data sample, or when there is no match between the first count values and the second count value:
- search the storage locations for time stamps that straddle the recorded time value; and
- interpolate the resampled data point from the data samples stored in the storage locations that straddle the recorded time value.

28. The system of claim 25, wherein the receiver is further configured to:
- generate a count value based on each received time stamp;
- store each count value at the storage location associated with its corresponding data sample; and
- use the count values to identify the storage locations associated with the respective time stamps.

29. The system of claim 17, wherein the receiver is further configured to:
- determine an arrival time instant of each received data sample; and
- associate each arrival time instant with a predetermined sampling time.

30. The system of claim 29, wherein the receiver is further configured to:
- update a time-keeping mechanism based on the arrival time of a received data sample.

31. The system of claim 17, wherein the receiver is further configured to:
- determine an arrival time instant of each received data sample;
- filter the arrival time instants to generate expected arrival time instants; and
- associate each of the received data samples with one of the expected arrival time instants.

32. The system of claim 17, wherein the receiver comprises a receiving intelligent electronic device for protection of an electric power system.

33. The system of claim 32, further comprising a transmitting intelligent electronic device for protection of an electric power system, the transmitting intelligent electronic device comprising a sampler for generating the data samples.

34. A machine readable storage medium comprising computer executable instructions that when executed by a computer cause the computer to perform method for resampling a signal, the method comprising:
- receiving, through a receiver in communication with a remote device through a communication channel, a plurality of data samples representative of an analog signal, wherein the data samples are received in a first order that is different than a second order in which the data samples are transmitted from the remote device;
- associating each of the received data samples with a respective sampling time instant;
- reordering, based on the association of the received data samples with the respective sampling time instants, the received data samples from the first order to the second order; and
- resampling the plurality of data samples, the resampling comprising for each of a plurality of resampling time instants:
  - selecting one or more of the sampling time instants corresponding to the particular resampling time instant; and
  - generating a resampled data point from the received data samples associated with the one or more selected sampling time instants.

35. The machine readable storage medium of claim 34, wherein generating the resampled data point comprises interpolating between two received data samples.

36. The machine readable storage medium of claim 34, wherein associating each of the received data samples with a respective sampling time instant comprises:
- generating a first count value for each of a plurality of predetermined sampling times;
- generating a plurality of first index values, each first index value representing one of the plurality of predetermined sampling times;
- associating each of the plurality of first index values with one of the first count values; and
- storing the plurality of first index values at respective storage locations corresponding to the associated first count values.

37. The machine readable storage medium of claim 34, wherein associating each of the received data samples with a respective sampling time instant comprises:
- receiving a time stamp with each of the plurality of data samples, each time stamp encoded with one of the sampling time instants; and
- storing the plurality of received data samples at storage locations corresponding to their respective time stamps.

38. The machine readable storage medium of claim 34, wherein associating each of the received data samples with a respective sampling time instant comprises:
- determining an arrival time instant of each received data sample; and
- associating each arrival time instant with a predetermined sampling time.

39. The machine readable storage medium of claim 34, wherein associating each of the received data samples with a respective sampling time instant comprises:

determining an arrival time instant of each received data sample;

filtering the arrival time instants to generate expected arrival time instants; and associating each of the received data samples with one of the expected arrival time instants.

40. The machine readable storage medium of claim 34, the method farther comprising using the resampled data points for protection of an electric power system.

41. A system comprising:

sampling means for:

generating a plurality of data samples representative of an analog signal; and associating each of the plurality of data samples with an indication of a respective sampling time instant;

transmitting means for transmitting the plurality of data samples and the corresponding indications of respective sampling time instants;

receiving means for receiving the plurality of data samples and the corresponding indications of respective sampling time instants, wherein the data samples are received in a first order that is different than a second order in which the data samples are transmitted from the transmitting means, and wherein the receiving means reorders the received data samples from the first order to the second order based on the received indication; and resampling means for generating a stream of resampled data points based on the respective sampling time instants and a series of resampling time instants.

42. The system of claim 41, further comprising interpolation means for generating resampled data points corresponding to the resampling time instants.

* * * * *